United States Patent
Chang et al.

[11] Patent Number: 5,924,100
[45] Date of Patent: Jul. 13, 1999

[54] FLEXIBLE OBJECT REPRESENTATION OF RELATIONAL DATABASE CELLS HAVING NONTRADITIONAL DATATYPES

[75] Inventors: Daniel T. Chang, San Jose; Douglas M. Hembry; Basuki N. Soetarman, both of Los Gatos; Robert N. Summers, San Jose, all of Calif.

[73] Assignee: International Business Machines Corp., Armonk, N.Y.

[21] Appl. No.: 08/852,055

[22] Filed: May 6, 1997

[51] Int. Cl.$^6$ ..................................................... G06R 17/30
[52] U.S. Cl. ............................................. 707/103; 707/104
[58] Field of Search ................................ 707/1, 100, 103, 707/104, 200, 2

[56] References Cited

U.S. PATENT DOCUMENTS

| | | | |
|---|---|---|---|
| 5,235,701 | 8/1993 | Ohler et al. ................................ | 395/600 |
| 5,261,098 | 11/1993 | Katin et al. ............................... | 395/650 |
| 5,291,583 | 3/1994 | Bapat ......................................... | 395/500 |
| 5,448,727 | 9/1995 | Annevelink ............................... | 395/600 |
| 5,504,892 | 4/1996 | Atsatt et al. .............................. | 395/600 |
| 5,542,078 | 7/1996 | Martel et al. ............................. | 395/600 |
| 5,649,195 | 7/1997 | Antognini et al. ....................... | 395/609 |
| 5,713,020 | 1/1998 | Reiter et al. .............................. | 395/613 |
| 5,729,730 | 3/1998 | Wlaschin et al. ........................ | 395/603 |
| 5,729,739 | 3/1998 | Cantin et al. ............................. | 395/614 |
| 5,732,257 | 3/1998 | Atkinson et al. ......................... | 395/604 |
| 5,737,736 | 4/1998 | Chang ........................................ | 707/102 |
| 5,758,153 | 5/1998 | Atsatt et al. .............................. | 707/103 |
| 5,778,378 | 7/1998 | Rubin ........................................ | 707/103 |
| 5,799,310 | 8/1998 | Anderson et al. ........................ | 707/102 |

OTHER PUBLICATIONS

Fitsilis et al. "Producing Relational Database Schemata from an Object Oriented Design" IEEE, pp. 251–257, Apr. 1994.
Blaha et al. "Converting OO Models into RDBMS Schema" IEEE Software, pp. 28–39, May 1994.
Hsieh et al. "Capturing the Object–Oriented Database Model in Relational Form" IEEE, pp. 202–208, Jul. 1993.

*Primary Examiner*—Paul V. Kulik
*Assistant Examiner*—Michael J. Wallace, Jr.
*Attorney, Agent, or Firm*—Sughrue, Mion, Zinn, Macpeak & Seas, PLLC

[57] ABSTRACT

A program product is described in which a class library is provided to permit object oriented applications flexibly to access and to manipulate, in accordance with the object model, nontraditional data values of a relational table. Nontraditional datatypes of a relational table include multimedia and large object datatypes. The data is manipulable by virtue of extended data objects that each represent particular cells of a relational table, and that inherit type-specific behaviors from the class library.

8 Claims, 4 Drawing Sheets

Fig. 1

PRIOR ART

Fig. 2

PRIOR ART

Fig. 3

PRIOR ART

| Name | I.D. Image |
|---|---|
| Jane Jones |  |
| John Smith |  |

Fig. 6

FLEXIBLE OBJECT REPRESENTATION OF RELATIONAL DATABASE CELLS HAVING NONTRADITIONAL DATATYPES

FIELD OF THE INVENTION

This invention relates to object oriented programming and relational database management systems. In particular, this invention relates, in a computer system, to the object representation of relational database cells which have nontraditional datatypes. More particularly, such cells are represented as client objects.

BACKGROUND OF THE INVENTION

Relational database products, which are used in computer systems, now support nontraditional column datatypes such as audio and video. As used here, the term "computer systems" encompasses the widest possible meaning and includes, but is not limited to, standalone processors, networked processors, mainframe processors, processors in a client/server relationship, and embedded processors. When object oriented applications access rows of relational tables, the data value of the cell is retrieved into an object. The object makes available the value of the nontraditional datatype, but the manipulation of the value via behaviors or methods of the object is not accommodated. Such manipulation presently is possible only through calls to the database server. Thus, object oriented applications programs cannot access and manipulate nontraditional type data values from relational tables according to the object oriented programming paradigm.

SUMMARY OF THE INVENTION

This invention allows an object oriented client application to construct an instance of a class for the purpose of representing a single cell in a relational table that contains one or more nontraditional datatypes.

The attributes and behavior of a nontraditional datatype in the database is preserved, where appropriate, in a corresponding class in the client, and are available to the client application.

The invention is primarily oriented towards the C++ programming language, but may be extended to other object oriented languages or environments capable of supporting its concepts, such as SMALLTALK, the MICROSOFT OLE/COM architecture, and others.

The above and other objects and advantages of the invention will become apparent from the following detailed description and with reference to the accompanying drawing figures.

DETAILED DESCRIPTION OF THE PREFERRED EMBODIMENT

Prior to describing the presently preferred embodiment of the invention, some details concerning the prior art will be provided to facilitate the reader's understanding of the invention and to set forth the meaning of various terms.

Computer applications programmers develop computer-based applications to fulfill end user needs. The advance of technology has made it possible to develop applications of great complexity. One of the key aspects of fulfilling end user needs is the correct representation of complex real-world systems.

The need to represent real-world systems in computer usable form has led to the existence of databases for storing, retrieving, and manipulating data. Applications programs may include internal logic to handle such tasks, but a more useful approach is to provide a set of computer programs that facilitates the creation, management, and manipulation of databases. Such a set of computer programs for managing one or more databases is a database management system. Using a database management system, an applications programmer may write an applications program without detailed, intimate knowledge of how or where the data is stored or retrieved. Thus, database management systems provide a measure of independence between the data of a database and the applications programs. This advantage may be referred to as data independence.

Data independence is desirable. Without data independence, a change in the structure of underlying data necessitates a corresponding change in the applications programs that rely on such a structure. The data independence provided by database management systems serves to avoid applications program modification.

In an environment having a database management system, applications programs communicate with an automated database manager. The database manager may be referred to as a database server. In particular, the applications programs may send messages to the database server in a predefined format. Such formatted messages may be referred to as database calls. A database call invokes one or more corresponding functions of the database management system, usually with respect to a particular database. A database management system provides applications programs with a variety of callable functions.

Every database management system is based on a general database model. The following are examples of well-known database models: the hierarchical model, the network model, and the relational model. A database management system based on the relational model may be referred to as a relational database management system (RDBMS). An RDBMS is a system of computer programs that facilitates the creation, management, and manipulation of relational databases.

Relational database management systems

Every relational database is based on the relational model. The relational model is familiar to one of skill in the art. The book "An Introduction to Database Systems", by C. J. Date (Addison Wesley Publishing Company) provides an in-depth guide to the relational model, and hereby is incorporated in its entirety by reference. An example of an RDBMS is DB2, which is available commercially through International Business Machines Corporation.

Figure 1:
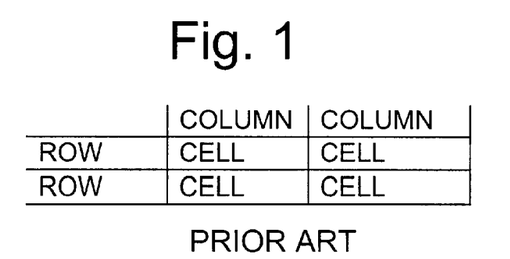
FIG. 1 shows a relational table.

According to the relational model, data is perceived to exist as a collection of relational tables. An example of a relational table is shown in FIG. 1.

A relational table expresses a relation between things. Relational tables are characterized by rows and columns (see FIG. 1). Although the rows and columns of relational tables may be employed in many ways, the relational model provides that columns pertain to entities or attributes of entities, and that rows pertain to specific instances of entities or specific instances of attributes of an entity.

The rows and columns of a relational tables intersect to define data cells.

Although the structure of the relational model provides for tables, rows, columns, and cells, a certain hierarchy may be observed within the model. That is, a relational database comprises one or more tables; each table comprises one or more rows; each row comprises one or more cells. Thus, the relational model defines four adjacent layers of hierarchy: databases, tables, rows, and cells. The tables layer is the next higher layer of the rows layer. The cells layer is the next lower layer of the rows layer. The tables layer is adjacent the rows layer, but is not adjacent the cells layer. Moreover, a given table may be referred to as an instance of the table layer, a given row as an instance of the row layer, and so on.

Although the relational terminology of tables, rows, columns, and cells is used throughout this description, one of skill in the art will appreciate that the concepts presented herein may be applied outside of the relational model to great advantage. In particular, the concepts are applicable in any database environment in which the data model similarly includes a hierarchy of adjacent layers.

The function calls that an applications program may make to the database server have a somewhat standardized structure that is tailored to the relational model. This structure for RDBMS function calls is generally referred to as the Structured Query language (SQL).

Traditional and nontraditional datatypes

Each column of a relational table has a respective datatype. The datatype of ai column restricts the values which the cells of that column may be. For instance, a traditional datatype for a column of a relational table is the integer datatype. If a column has the integer datatype, the cells of that column may have only integer values. Variations on the integer datatype include the small and the large integer datatypes. The small integer datatype is so named because it conventionally is limited in length to half of a word. The large integer datatype, by contrast, may be allocated two words.

Other traditional datatypes include packed decimal, floating point, fixed length character, and variable length character datatypes. The fixed length and variable length character datatypes, traditionally, have been limited to only a few thousand bytes (i.e., Kbytes) in length.

As is the case with the integer datatype, variations exist with respect to the other traditional datatypes. Some special purpose variations of the traditional datatypes include logical, money, date, and time.

One of skill in the art will appreciate that the traditional datatypes have, at their core, the concept of character or numeric data. Fixed length character and variable length character datatypes thus have in common an orientation on character data and a limitation to only a few thousand bytes in length. Integer, packed decimal, floating point, money, date, time, and logical datatypes can be viewed as having in common an orientation on numeric values.

Traditional datatypes are further characterized in that they are atomic. That is to say, a value stored in a cell has a simple, atomic structure instead of a complex structure. One of skill in the art will appreciate that lists and tables, for example, are non-atomic and therefore fall outside the definition of traditional datatypes. Although a list might be stored in a cell of a column that has the traditional character datatype, it is to be understood that, after storage of the list, the cell does not hold a list per se. That is, the cell holds a string of characters that make up what formerly was a list. A list so stored loses its identity as a list, and can be manipulated by the RDBMS as only one atom of data.

For the purposes of the following discussion, therefore, the term "traditional" datatypes will be understood to encompass atomic numeric-oriented datatypes and atomic character-oriented datatypes of no more than a few Kbytes. The term "nontraditional" datatypes will be understood to refer to datatypes that do not fit the foregoing definition of traditional datatypes.

RDBMS's recently have been improved to provide support for some nontraditional datatypes. Some supported datatypes include images, video, fingerprints, large objects (LOBs), and audio. In other words, a cell of a relational table may now contain data that is an image, a video segment, a fingerprint:, text of great length (such as a book), or an audio segment. Thus, the columns of a relational table now may have nontraditional datatypes as their respective datatypes.

Other nontraditional datatypes either presently are or soon will be supported. Examples of other nontraditional datatypes are spreadsheets, lists, and tables, to name but a few. Although a spreadsheet contains numeric and character information, one of skill in the art will appreciate that a spreadsheet is not atomic, and that the functionality offered by a typical spreadsheet goes well beyond the simple numeric-oriented and character-oriented traditional datatypes.

Applications programs

As mentioned above, applications programs access the data of relational tables by making calls to a database server. Used in this sense, the term "applications programs" may refer to several separate programs, only one program, a module of a program, or even a particular task of a module.

An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

The object model

The OO paradigm is based on the object model. One of skill in the art readily understands the object model. For detailed information concerning the object model, a useful book, which herein is incorporated in its entirety by reference, is "Object-oriented Analysis and Design", by Grady Booch (Addison-Wesley Publishing Company).

Recently, object oriented analysis and design (OOAD) and object oriented programming (OOP) have been the focus of great attention. OOAD and OOP are thought to provide advantages with respect to abstraction, encapsulation, modularity, and hierarchy. Furthermore, OOAD is thought to provide for improved software reuse and better adaptability to change.

According to the object model, a software system is modeled as collections of cooperating objects. Individual objects are treated as instances of a particular class. Each class has a place within a hierarchy of classes.

An object is understood to have a unique identity, to have a state, and to exhibit behavior. The behavior of an object relates to the set of operations that may be performed by the object. Such operations are also known, interchangeably, as methods of the object or as member functions of the object.

Member functions of an object are invoked by passing the object an appropriate message.

An object may retain data of interest. Passing the object appropriate messages may invoke a member function of the object to manipulate the data. For example, an object presently might retain an image of the Washington Monument, and might have a member function for rotating an image. Under the object model, when an appropriate message, such as "rotate image 45 degrees", is passed to the object the rotating member function is invoked and the image is rotated 45 degrees. The image, thus rotated, is retained in this state.

The invoking of member functions of objects to perform tasks is a central concept of the OO paradigm.

Objects can be related to each other. Two objects might have a client/supplier relationship. Such objects are said to be linked. Two objects might have a hierarchical relationship. For example, one object might represent a finger and another a hand. The hand object may thus be said to be higher in a hierarchy than the finger. Assuming the hand has more than one finger, there might be several finger objects that are so related with the hand object. Hierarchically related objects are said to be aggregated. In particular, the hand object and its finger objects may be referred to as an aggregate, or an aggregation. The finger objects may be referred to as being attributes, or members of the aggregation. The hand object, by virtue of its position at the "top" of the hierarchy in the aggregation, may be referred to as an aggregating object.

An object cannot be considered without regard to its class. Every object, when constructed, receives its structure and behavior from its class. An object may be referred to as a class instance, or as an instance of a class. Classes, in the object model, may be hierarchically related. In particular, the relationship between two classes may be a subclass/superclass relationship. A subclass may inherit the structural and behavioral features of its superclass.

Thus, whenever an object is constructed, it receives important attributes from its class, such as a predefined set of member functions. If that class is a subclass of a particular superclass, the object may receive certain attributes from the superclass as well.

Class libraries

Classes, on a practical level, are supplied in class libraries on any one of a variety of media. Furthermore, the class definitions contained in class libraries are actually statements written in a programming language. Such programming language statements, when executed by a computer, cause the computer to act in accordance with the particular content of the statements. Furthermore, a class library may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to supply a class library, the supplier might provide a diskette or might transmit the class library in some form via satellite transmission, via a direct telephone link, or via the Internet.

Although a class library might be "written on" a diskette, "stored in" an integrated circuit, or "carried over" a communications circuit, it will be appreciated that, for the purposes of this discussion, the computer usable medium will be referred to as "bearing" the class library. Thus, the term "bearing" is intended to encompass the above and all equivalent ways in which a class library is associated with a computer usable medium.

For the sake of simplicity, therefore, the term "program product" is hereafter used to refer to a computer useable medium, as defined above, which bears a class library in any form.

Interaction between OO applications and RDBMS's

Tightly coupled OO applications

Figure 2:
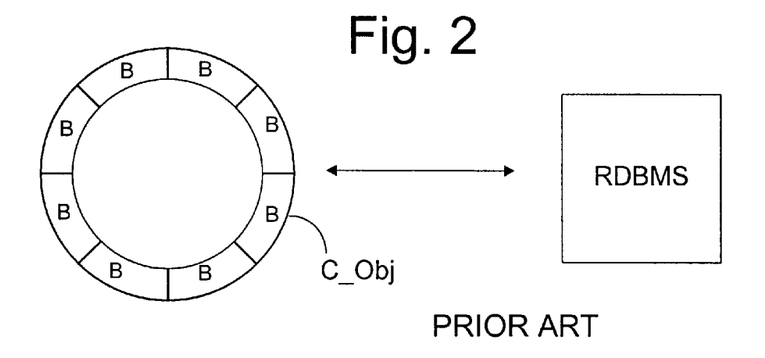
FIG. 2 shows a client object directly communicating with an RDBMS.

An OO applications program may access the data stored in a relational table by making function calls to the database server of the REBMS in SQL (see FIG. 2). For example, a class might be defined to have behaviors B that: generate appropriate SQL statements; package the statements and forward them to the database server; receive the results; process the results; and so on. When such a program is executed, client objects C_Obj of the foregoing class would be (constructed as necessary, and their behaviors B invoked in accordance with the particular task.

In FIG. 2, a particular client object C_Obj is depicted. An arbitrary set of Data values DV is held in the object. The object has an arbitrary number of behaviors B, also known as member functions.

This approach, however, is not desirable. In particular, the applications programmer must have an intimate knowledge of the RDBMS and its SQL function calls. The applications programs and the RDBMS become tightly coupled under this basic approach. A change to the RDBMS, therefore, often requires extensive changes in all of the tightly-coupled applications programs.

Another disadvantage of this approach is that applications programmers must depart from the object model with respect to accessing and manipulating data from the relational tables. Applications programmers must instead use and apply the relational model. In particular, applications programmers must fully understand SQL, must have retailed knowledge of the database schema, and must "switch" their thinking from the object model to the relational model.

Loosely coupled OO applications

Figure 3:
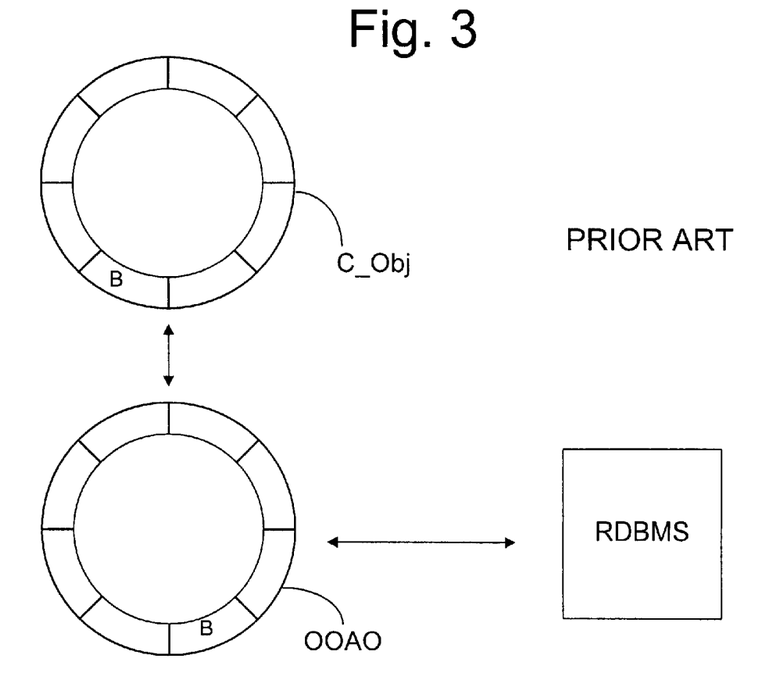
FIG. 3 shows a client object using a data access facility to communicate with an RDBMS.

An alternative approach is to provide an OO interface between the RDBMS and applications programs (see FIG. 3). That is, instead of making function calls directly to the database server of the RDBMS, a client object C_Obj may pass an appropriate message to an intermediate OO access facility (OOAO, for object oriented access object) which is responsible for direct communication with the database server.

Such a facility may be referred to as a data access product, a data access facility, or an object oriented access facility. One example of a data access product is provided by the data access classes of the IBM OPEN CLASS LIBRARY, which is available commercially from International Business Machines Corporation.

The particulars of a data access facility are not the subject of the invention, and the precise manner in which a data access facility may be realized is omitted for the sake of clarity.

Some of the important services provided by a data access facility are a schema mapper and a class generator.

In functioning as an intermediary between applications programs and an RDBMS, a data access facility may provide one or more classes from which one or more intermediate objects are constructed. Objects of an applications program, which may be referred to as client objects, may pass messages to the objects of the data access facility. It will be assumed, for simplicity during the following discussion, that a data access facility provides one intermediary object. Such an intermediary object shall be referred to as an object oriented access object (OOAD).

Under this approach, client objects may be simplified because the OOAO has the responsibility for intimate knowledge of the database schema, of the precise syntax of SQL calls, and of the method of communicating with the database server. Applications programmers are thus freed from such responsibility, and can operate more completely under the object model. One important way in which the OOAO allows more complete operation under the object model is that, since the OOAO is itself an object, client objects communicate with it in the OO manner of passing messages to invoke member functions B.

An additional advantage to the loose coupling made possible by the data access facility is that a change in the underlying RDBMS is less likely to require a change in applications programs that access data in relational tables via the OOAO. The way the data access facility interacts with the changed RDBMS might need to be altered, but the data access facility may yet retain an identical external appearance with respect to its interactions with client objects.

Improved object model support for OO applications

Figure 4:
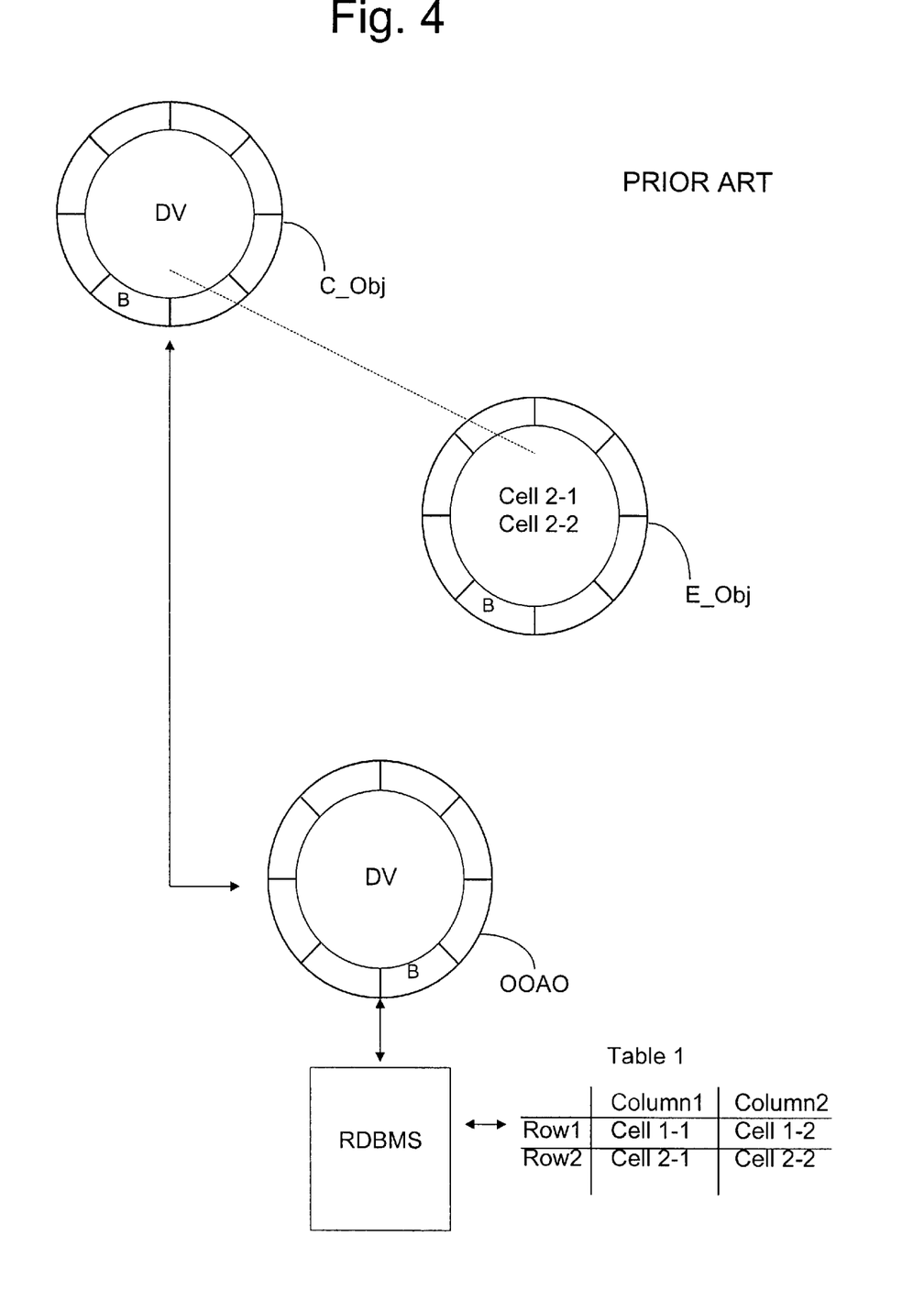
FIG. 4 shows the construction of an entity object in response to a client object request.

In the arrangement according to FIG. 3, the OOAO provides a cell value directly to the client object in response to the client object's message. So as more closely to adhere to the object model, however, it is desirable that the OOAO return, instead, an object that represents the row that the cell belongs to. An object that represents a single retrieved row is hereafter referred to as an entity object. FIG. 4 shows such an arrangement.

In FIG. 4, a relational table "Table 1" is managed by an RDBMS. Table 1 has two rows (Row1 and Row2) and two columns (Column1 and Column2). At each row/column intersection is a cell. The four cells are named, for the purposes of this example, according to their row and then their column. Thus, the cell in the second row, first column is named Cell 2-1.

A OOAO of a data access facility communicates with he RDBMS in response to messages from a client object C_Obj. In this example, client object C_Obj has requested the OOAO to retrieve from the database a particular row of a particular table, to wit, Row2 of Table 1. The OOAO has responded by constructing an entity object E_Obj that represents Row2 of Table 1. The entity object E_Obj holds as data values DV the particular values of the cells of Row2. That is, the entity object holds the value of Cell 2-1 and the value of Cell 2—2.

The dashed line in FIG. 4 represents a link to the entity object. The OOAO constructs the entity object E_Obj and provides a link thereto to the client object C_Obj.

Assuming that the cell data values of the entity object are traditional datatypes, the approach as described in connection with FIG. 4 provides excellent support for the object model.

In particular, the OO applications program accesses relational data through client objects according to the object model's concept of objects passing messages to other objects. In other words, the client object need not communicate directly with the database server because it can pass messages to the OOAO. Thus, the request for data by the applications program is made substantially in accord with the object model.

The fact that an entity object is returned also strongly comports with the object model. That is, the OO applications program is provided not with mere data values, but with a link to an entity object that can be treated under the object model. Thus, the reply to the applications program's request for data fits within the object model.

The entity object constructed in response to the request of a client object is generally based on a class from a class library included in the data access facility. The classes from which entity objects are constructed provide support for the manipulation of cell data values if the cells come from columns having traditional datatypes. For example, Column1 of Table 1 in FIG. 4 might have an integer datatype which is a traditional datatype. As well, the entity object may be provided with member functions B that include operations such as add, subtract, and the like. For an entity object representing character data, the entity object may be provided with member functions B that perform substring, concatenation, deletion, and so on.

Thus, if an integer value were stored in Cell 2-1, the client object C_Obj might increment the value by having the OOAO retrieve the row Row2 into an entity object E_Obj, and then by passing the entity object E_Obj a message (not shown) to invoke the "increment" member function B, and then by passing the entity object a message (also not shown) to invoke the member function that updates the relational table with the present values stored in the entity object.

Support for nontraditional datatypes

The class libraries provided with data access facilities typically do not support nontraditional datatypes. That is, entity objects created by a data access facility have adequate methods to manipulate data values of the traditional datatypes, but do not have methods to manipulate data values of the nontraditional datatypes.

To explain this situation, the following example is provided. Returning to FIG. 4, it is to be assumed that Column1 has a datatype of character, which is a traditional datatype. Column2 has a datatype of image, which is a nontraditional datatype. In this example, the relational table includes employee names in Column1 and corresponding employee identification images in Column2. It is further to be assumed that Row2 pertains to the employee named "John Smith". Thus, Cell 2-1 contains the string "John Smith", and Cell 2-2 contains a digitized identification image in a particular image format.

The entity object E_Obj has methods B for the manipulation of the data value "John Smith". These methods may be invoked by passing the entity object an appropriate message in accordance with the object model.

The entity object does not, however, have methods for the manipulation of John's image. Suppose that it were desired to rotate the image clockwise one-quarter turn (ninety degrees). Since the entity object lacks an appropriate method, the image rotation cannot straightforwardly be manipulated in accordance with the object model.

Some RDBMS products provide server-based functions that manipulate data of a nontraditional datatype. To invoke such server-based functions, an appropriate SQL statement must be provided. For example, an SQL statement that might provide the desired rotation of an image data value could appear as follows:

SELECT ROTATE(TABLE1.COLUMN2,90) WHERE TABLE1.COLUMN1="John Smith".

According to this method, the image that originally was retrieved and found to be in need of rotation is not actually rotated. What happens with the use of server-based functions is that the image is re-retrieved from the table in the server, is rotated by the server, and is then provided in response to the SQL statement. The image manipulation occurs at the database server, and is performed by the RDBMS.

The use of server-based functions is disadvantageous also in that operation under the object method must temporarily be suspended whenever the manipulation of nontraditional datatypes is desired.

The prior art having been sufficiently described, and the meaning of various terms having been set forth, a description of the presently preferred embodiment of the invention will be given.

Presently preferred embodiment

According to a presently preferred embodiment of the invention, a class library program product is provided whereby cells of a nontraditional datatype are represented by objects known as (EXOB's). The class library program product may be referred to as an EXOB class library. The classes of the EXOB class library may generally be referred to as EXOB classes.

In particular, when an application desires access to a cell of a relational table, and the cell contains a nontraditional datatype, an EXOB class instance of a matching type may be instantiated in the application to represent that data. The EXOB instance will provide a public interface for adding, retrieving, updating, and deleting its data to and from the corresponding table location; for accessing the object's attributes; and for manipulating the data in various type-dependent ways.

Returning now to the "John Smith" example, in which Column1 of a relational table has a traditional character datatype and Column2 has a nontraditional image datatype, the invention is described in more detail with reference to FIGS. 5 and 6.

Figure 5:
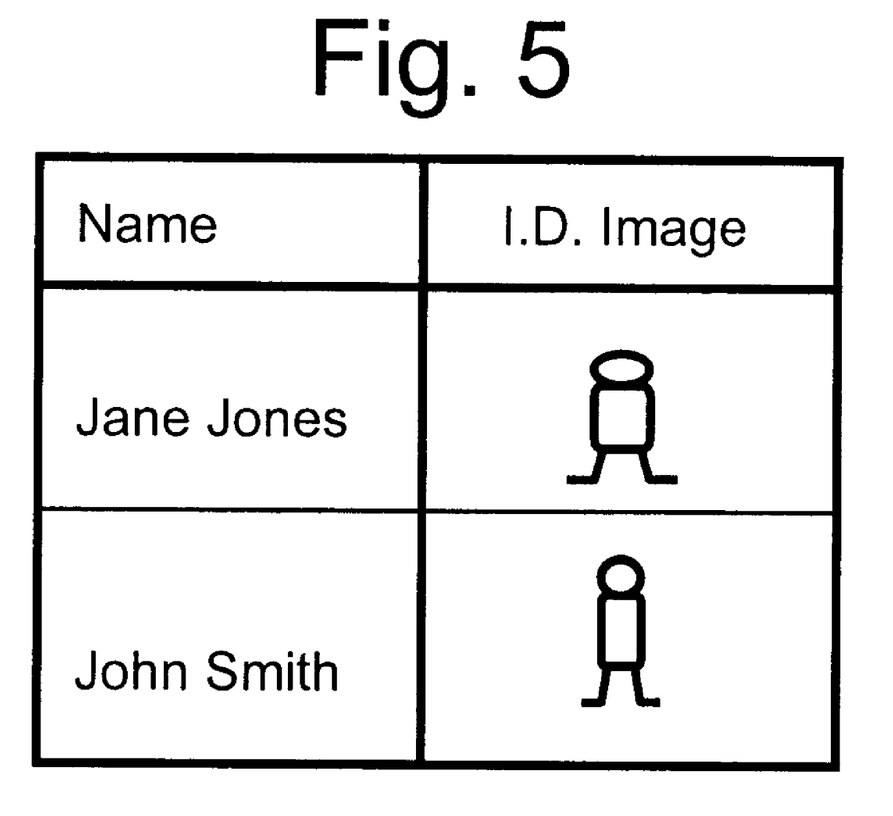
FIG. 5 shows a relational table containing data of a nontraditional datatype.

FIG. 5 represents the foregoing relational table. It will be understood that the column called "Name" corresponds to Column1 in the earlier-described examples, and that the "I.D. Image" column corresponds to Column2. The first row of the table, which corresponds to Row1 in the earlier examples, thus contains two cells. The data value of the first cell of this row is of a character datatype by virtue of the datatype of the Name column, and happens to be "Jane Jones". The data value of the second cell of this row is of an image datatype by virtue of the image datatype of the I.D. Image column, and is a digitized image of Jane Jones. Likewise, the second row (Row2) also has two cells, the first of which contains the characters "John Smith" and the second of which contains a digitized image of John Smith.

Figure 6:
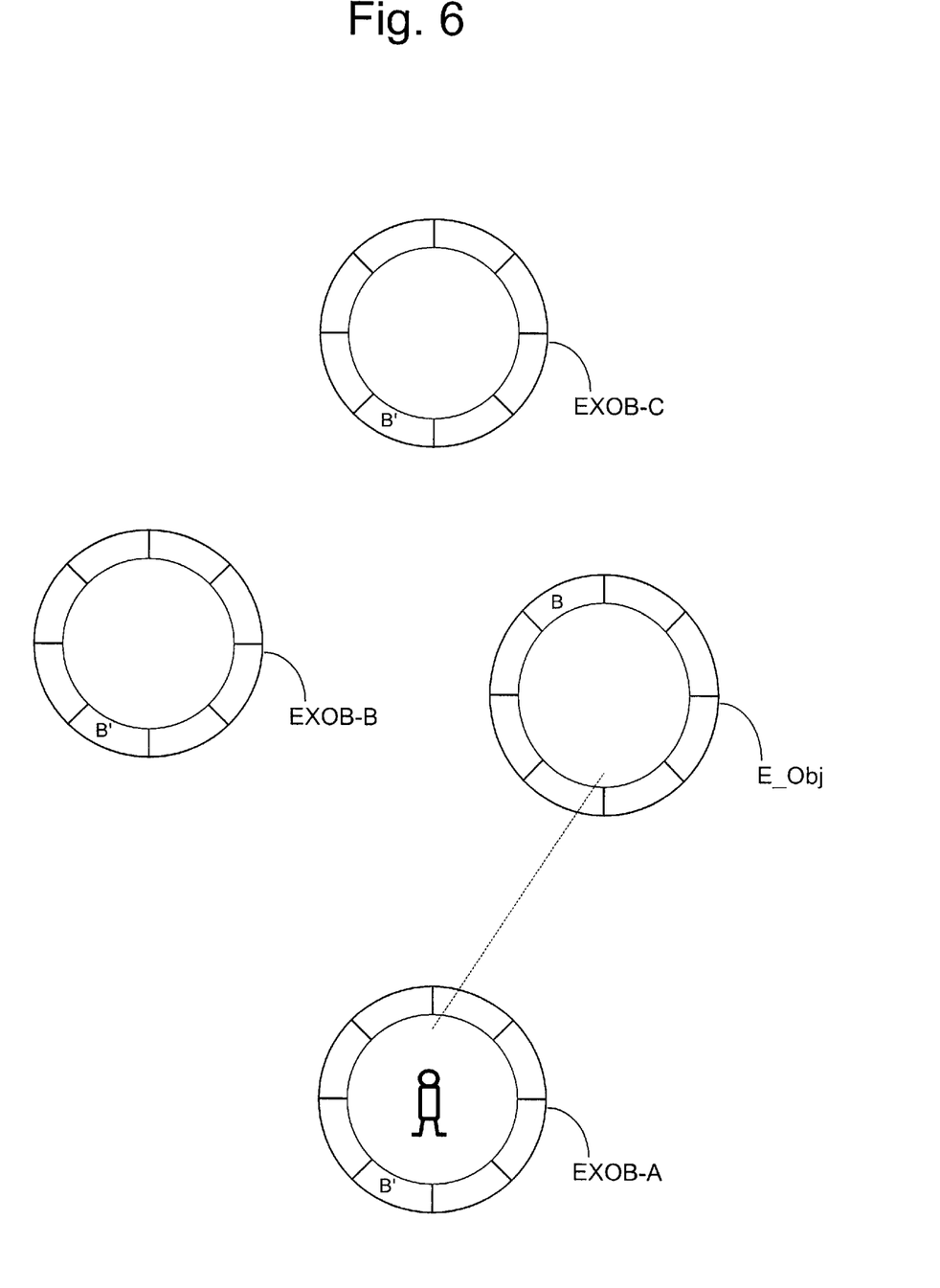
FIG. 6 shows the use oi : autonomous stand-alone extended data objects in an exemplary applications program.

For improved clarity, the RDBMS and OOAO are not shown in FIG. 6.

The EXOB is constructed on the basis of a particular one of the EXOB classes. For each nontraditional datatype of the RDBMS, the EXOB class library includes a particular class within which the type-specific functions are defined. To put it another way, the EXOB that is instantiated to hold an image data value includes member functions that are specific to the manipulation of image data. Similarly, each EXOB class is expected to provide type-specific functions through which the client application can access and process its state data. In the example above, the table could have had a column of a particular nontraditional datatype: the LOB (for Large OBject). A LOB EXOB class might provide a function to export its data to a client kile, from where a handler program such as a spreadsheet editor could process it.

The image EXOB class, in addition to a rotate feature, might provide functions to convert an image format, or to render and zoom a chosen area. For video data, a video EXOB class could provide video-specific operations to invoke an operating system streaming service (such as MMPM/2 for OS/2), and to locate selected frames or scenes within a clip.

As one knowledgeable in the art will appreciate, the location of selected frames within a video clip may be referred to as a type-specific behavior of the video EXOB class. The zooming of a portion of an image may be referred to as a type-specific behavior of the image EXOB class. Clearly, zoom could als eo be useful with respect to video frames, and so a type-specific behavior of one class need not be a behavior that is useful exclusively for that class. A type-specific behavior of a class is a behavior that is useful with respect to that class, but is not provided by the set of behaviors defined for traditional datatypes.

In other words, since zoom is not within the behaviors defined for traditional datatypes, if zoom is provided as a behavior for the image EXOB class then zoom is a type-specific behavior of that class. Also, if zoom is provided as a behavior for the video EXOB class, it likewise is a type-specific behavior of the video EXOB class.

In each case the public interface of the class would be designed to match the characteristics and usage of the particular nontraditional datatype in the client environment.

The presently preferred embodiment of the invention relates to the provision of a flexible set of EXOB's. In particular, according to this embodiment of the invention, EXOB's may be aggregated or stand-alone; associated or non-associated; autonomous or non-autonomous.

According to the invention, an applications programmer may separately define an EXOB. Such an EXOB is referred to as a stand-alone EXOB.

In particular, EXOB's may individually be created by an applications program. Immediately after such creation, the EXOB lacks data and is not immediately useful for data manipulation. Nevertheless, such a feature provides the applications programmer with another tool for customization of an applications program.

Another means by which a stand-alone EXOB may be obtained is by disaggregating the EXOB from a respective entity object after automatic creation of an aggregation. According to this method, the applications program requests a particular row from the OOAO, and the OOAO is adapted to produce an entity object that includes one or more aggregated EXOB's. Afterward, the applications program takes advantage of an appropriate member function of either the entity object or the EXOB to remove the EXOB from the aggregation, thereby making the EXOB a stand-alone EXOB.

According to the invention, member functions are provided that permit the aggregating of a stand-alone EXOB as a member of an entity object's aggregation to make the EXOB an aggregated EXOB. Furthermore, in accordance with the invention, member functions are provided that permit an aggregated EXOB to be removed from membership in (disaggregated from) an entity object's aggregation to make the EXOB a stand-alone EXOB.

Thus, EXOB's according to this embodiment may be aggregated EXOB's or stand-alone EXOB's. Stand-alone EXOB's may be directly created by an applications program. Stand-alone EXOB's may indirectly be created by using an appropriately-adapted OOAO and by subsequent disaggregation.

EXOB's, according to the invention, may also either be associated with a particular cell or not. An EXOB that is associated with a particular cell is an associated EXOB. An EXOB that is not associated with a particular cell is a non-associated EXOB.

A stand-alone EXOB, when directly created by an applications program, is a non-associated EXOB because it is not associated with any database location. Although a directly created, non-associated, stand-alone EXOB is initially empty, data may be provided to it by the applications program itself, and the public interface of the EXOB may then be used by the applications program to further access and manipulate the EXOB and its data. However, no data may be written to the database from the non-associated EXOB. Likewise, data may not be retrieved from the database into the non-associated EXOB.

It may be the case that EXOB's may access data from the database through an entity object. In other words, that EXOB's access data from the database indirectly, by way of the member functions of the entity object, instead of directly, by way of member functions of the EXOB. In the present invention, further consideration is given as to whether direct EXOB database access is possible.

In particular, an EXOB that lacks member functions for directly accessing database data is a non-autonomous EXOB. An EXOB that possesses member functions that permit it directly to access database data is an autonomous EXOB. Here, it should be noted that whether an EXOB actually accesses database data through an entity object is not determinative of its autonomous or non-autonomous status. What determines this status is the set of member functions defined for the EXOB.

An autonomous EXOB, once it is associated with a particular cell in a row of a table, may be invoked so as to write to or to retrieve from that cell in an independent manner. In other words, using the appropriate member functions of an autonomous EXOB permits data access without any involvement of other cells of the row that is represented by an entity object.

Naturally, the set of member functions that distinguish an autonomous EXOB from others may be somewhat arbitrary. According to the invention, however, every autonomous EXOB includes four "core" member functions for directly accessing data without relying on an entity object. These four core member functions are an "Add" function, a "Retrieve" function, an "Update" function, and a "Delete" function. These four core functions, hereafter, are referred to as ARUD functions (for Add, Retrieve, Update, and Delete).

It will be appreciated that, for the ARUD member functions to operate efficiently, there should be a persistent link between the EXOB and the particular cell. One way to implement the persistent link is to provide every EXOB with a special "persistent location" object. The persistent location object is provided with the information as to the database name, the table name, the column name, and key information for the table.

Thus, an autonomous EXOB that is a member of an aggregation may access data through the ARUD functions of the entity object or, if desired, may directly access data through the ARUD member functions in its own public interface.

The flexibility provided by the invention is illustrated by reference to FIG. 6 and the following example. In FIG. 6, the client object is omitted for clarity. The purpose of the applications program in this example is to allow a user to print out a color copy of an employee's stored image. The image is to be altered, before printing, by including in a corner thereof a company logo.

According to this example, an applications program has requested a row from the table of FIG. 5. Upon a retrieval request from the client object (not pictured), the OOAO creates the entity object E_Obj and invokes the retrieve function thereof. The retrieve function of the entity object generates appropriate SQL code and executes it to retrieve the requested row of data from the table.

The "Name" column of the table is a traditional datatype, and the character data of "John Smith" is retrieved into the entity object. For the "I.D. Image" column of the table, which is of a nontraditional datatype (i.e., image datatype), the entity object preferably automatically creates an autonomous instance of the EXOB that has type-specific member functions for handling image data. The entity object sets the persistent location for the EXOB. The entity object invokes the retrieve function of the EXOB and the image is retrieved into the EXOB. The aggregation that represents the row in the table now is complete.

The applications program now displays the Name information to the user while opening an appropriate image editor at the user's workstation. The application suspends further operation while the image editor is in use. The user may wish, for example, to adjust the brightness of the image. The logo is not added at this point. Once the user closes the image editor, the application continues.

The application next creates a stand-alone instance (EXOB-B) of the image EXOB class, and sets its contents to some desired value. Here, the desired logo is loaded into the EXOB-B as image data.

The applications program now invokes a member function of EXOB-A that provides for image overlay. Such an overlay function is a good example of a type-specific behavior of the image EXOB class. In other words, the applications program passes the EXOB-A a message that is reacted to by overlaying the image data in EXOB-B on the image data in EXOB-A.

At this point, the applications program pauses to permit printing of the updated image. After printing, the applications program may permit the user to store the updated image into the relational table (by invoking the update function of the EXOB or of the entity object). In this example, the user so updated the stored data.

Next, the applications program creates another stand-alone EXOB (EXOB-C) of the image EXOB class. The applications program sets the persistent location of EXOB-C so that it is the same as the persistent location set in EXOB-A. The retrieve function of EXOB-C is invoked, and the (previously updated) image is retrieved into EXOB-C. Now the applications program opens the user's image editor and pauses to allow the user to verify the changes to the image.

A document entitled "Extended Data Objects (XDO) Class Library—High Level specification and Design", available from International Business Machines Corporation, provides a concrete example of one embodiment of the invention as applied in a DB2 relational database environment; the document is incorporated by reference in its entirety.

As one knowledgeable in the art will appreciate, the availability of stand-alone and autonomous EXOB's, of autonomous EXOB's having at least the ARUD member functions, and of associated and non-associated EXOB's represents a substantial increase in the flexibility afforded the applications programmer. Moreover, it will be appreciated that the foregoing advantages are achieved without the need for the applications programmer to depart from the OO paradigm.

We claim:

1. In a computer system having a database under control of a database management system which supports a traditional datatype and a nontraditional datatype, said database including a table with rows and columns, cells being defined by intersections of said rows and said columns, one of said rows having a respective cell with said nontraditional datatype, a data access method for an applications program to access and manipulate a respective data value of said cell, comprising:

provide to said applications program a persistent locator object having a persistent locator which identifies said cell;

creating an instance of an extended data object to represent said cell, said extended data object having type-specific member functions for accessing and manipulating said respective data value;

providing said persistent locator object to said extended data object; and sending a message from said applications program to said extended data object to invoke one of said type-specific member functions with respect to said cell.

2. The data access method according to claim 1, wherein said nontraditional datatype is one of:

an image datatype pertaining to image data, a video datatype pertaining to video data, an audio datatype pertaining to audio data, and a large object datatype pertaining to data that has a length greater than 32 Kbytes.

3. In a computer system having a database under control of a database management system which supports a traditional datatype and a nontraditional datatype, said database including a table with rows and columns, cells being defined by intersections of said rows and said columns, one of said rows having a respective cell with said nontraditional datatype, a data access method for an applications program to access and manipulate a respective data value of said cell, comprising:

providing to said applications program an entity object representing said row, said entity object having respective member functions for accessing said row;

providing to said entity object an extended data object to represent said cell, said extended data object having type-specific member functions for accessing and manipulating said respective data value;

sending a message from said applications program to said extended data object to invoke one of said type-specific member functions with respect to said respective data value; and sending a message from said applications program to said entity object to invoke one of said respective member functions thereof with respect to said respective cells of said row.

4. The data access method according to claim 3, wherein said nontraditional datatype is one of:

an image datatype pertaining to image data, a video datatype pertaining to video data, an audio datatype pertaining to audio data, and a large object datatype pertaining to data that has a length greater than 32 Kbytes.

5. A program product for use with a computer system in which relational tables of a relational database management system are accessed by an applications program, said program product comprising:

a computer usable medium bearing computer programming statements for causing said computer system to respond to an access request of said applications program for access to data cells of a row of one of said relational tables by providing (A) an entity object representing said row and having traditional type data values for each of said cells of a traditional datatype, and (B) for each of said data cells that has a nontraditional datatype, an extended data object representing said cell and having a respective nontraditional type data value;

said computer programming statements including a class library expressing an inheritance hierarchy and including an EXOB base class for constructing instances of said extended data object;

said EXOB base class including, as a respective subclass thereof, an autonomous EXOB class defining core member functions for directly interacting with said only one cell using a persistent locator, said core member functions including an add function, a retrieve function, an update function, and a delete function;

said autonomous EXOB class further defining, as additional respective member functions thereof, functions for:

creation of said extended data object initially independent of said cell;

aggregating said extended data object with said entity object; and removing said extended data object from said aggregation with said entity object.

6. The program product according to claim 5, wherein said autonomous EXOB class includes, as a respective subclass thereof, a multimedia class having, an image subclass, a video subclass, and an audio subclass.

7. A computer system, comprising:

a database, including a table with rows and columns, cells being defined by intersections of said rows and said columns, a database management system controlling said database and supporting a traditional datatype and a nontraditional datatype, one of said rows having a respective cell with said nontraditional datatype, an applications program for accessing and manipulating a respective data value of said cell, wherein said applications program is provided by said computer system with a persistent locator object having a persistent locator which identifies said cell;

wherein said computer system creates an instance of an extended data object to represent said cell, said extended data object having type-specific member functions for accessing and manipulating said respective data value, said persistent locator object being provided to said extended data object; and wherein said applications program accesses and manipulates said respective data value of said cell by sending a message to said extended data object to invoke one of said type-specific member functions with respect to said cell.

8. The computer system according to claim 8, wherein said nontraditional datatype is one of:

an image datatype pertaining to image data, a video datatype pertaining to video data, an audio datatype pertaining to audio data, and a large object datatype pertaining to data that has a length greater than 32 Kbytes.

* * * * *

UNITED STATES PATENT AND TRADEMARK OFFICE
CERTIFICATE OF CORRECTION

PATENT NO. : 5,924,100
DATED : July 13, 1999
INVENTOR(S) : Daniel T. CHANG, et al.

It is certified that error appears in the above-identified patent and that said Letters Patent is hereby corrected as shown below:

Col. 1, line 61, delete "oi :"; and insert --of--.

Col. 7, line 3, delete "OOAD"; and insert -- OOAO --.

Col. 9, line 59, delete "kile"; and insert --file--.

Col. 10, line 6, delete "als eo"; and insert --also--.

Claim 8, line 1, change "according to claim 8" to --according to claim 7--.

Signed and Sealed this

Twenty-ninth Day of February, 2000

Attest:

Q. TODD DICKINSON

*Attesting Officer*     *Commissioner of Patents and Trademarks*